MILTON ROSENBERG
*INVENTOR.*

BY [signature]

ATTORNEYS

MILTON ROSENBERG
*INVENTOR.*

BY Lyon & Lyon

ATTORNEYS 3,303,479
Patented Feb. 7, 1967

3,303,479
MULTIAPERTURE MAGNETIC MEMORY SYSTEM

Milton Rosenberg, Santa Monica, Calif., assignor to Ampex Corporation, Culver City, Calif., a corporation of California Filed June 12, 1961, Ser. No. 116,379
5 Claims. (Cl. 340—174)

This invention relates to magnetic memory systems and, more particularly, to improvements therein.

The presently favored construction of magnetic-core memory systems employs a large number of magnetic toroidal cores which are arranged in a plurality of planes, each consisting of columns and rows of cores. Wires are then passed through the central apertures of these cores for affording data readin and data readout. Because of the small size of these cores, the wiring operation is difficult and rather costly. The cores themselves are not inexpensive. Furthermore, the cores are rather fragile, and a great deal of care must be taken in handling them until they are finally mounted on a frame and protected. The speed with which memories of this type can be operated with presently known materials is limited, in view of the time required to effectuate a 180° flux reversal. It is desirable, in view of the high-speed capabilities of data-handling machines, to increase the speed of operation of a magnetic memory system, which oftentimes determines the optimum speed of operation of the rest of the machine.

It is an object of this invention to provide a magnetic memory system which is simpler to fabricate than previously known systems of this type.

Another object of this invention is the provision of a magnetic memory system which can operate at higher speeds than those heretofore employed.

Yet another object of this invention is the provision of a magnetic memory system which affords a greater frequency of access to a given storage element without adverse effects than considered possible heretofore.

Still another object of the present invention is the provision of another novel and unique magnetic memory system.

These and other objects of the invention may be achieved in a memory arrangement wherein the magnetic material employed is in the form of a plate. A plurality of memory elements are established on the plate, each element being defined as the magnetic material contained in the region between a group of spaced holes which are disposed around the data-storage region. Wires are passed through these holes to permit magnetomotive drives to be applied to the data-storage region confined within the holes. The magnetization vector of the data-storage elements are aligned in response to the proper drive current applied to those wires in one or the other of two directions, respectively representative of a "one" or a "zero." By means of these wires, a magnetomotive drive may be applied to the region constituting a storage element, to enable the sensing or detection of the data which has been stored therein.

The novel features that are considered characteristic of this invention are set forth with particularity in the appended claims. The invention itself, both as to its organization and method of operation, as well as additional objects and advantages thereof, will best be understood from the following description, when read in connection with the accompanying drawings, in which:

Figure 1:
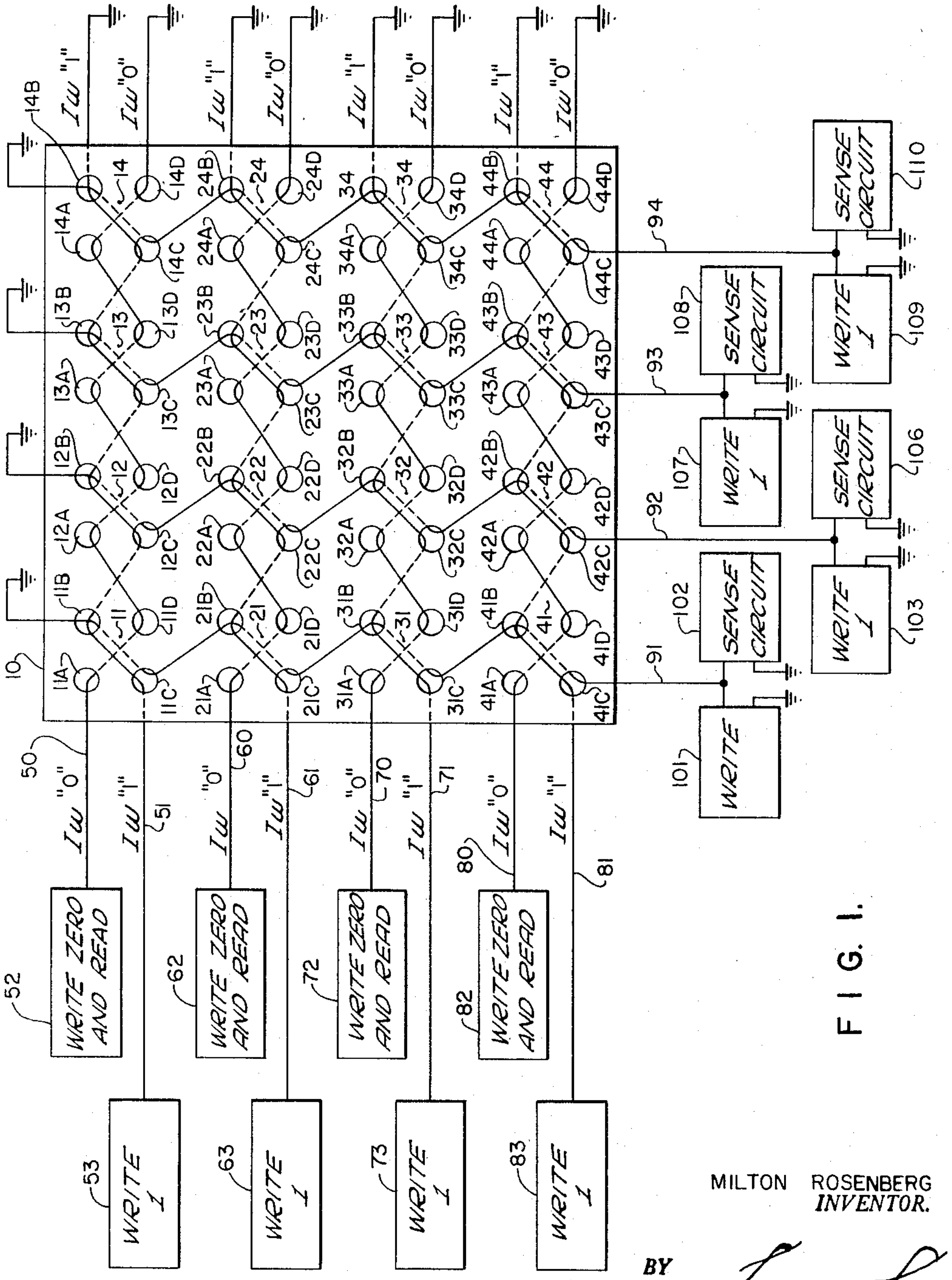
FIGURE 1 is a drawing of an embodiment of the invention.

Reference is now made to FIGURE 1, which is a drawing of the embodiment of the invention. This comprises a ferrite plate 10, whose size is determined by the number of elements it is desired to store thereon. The plate is made of any suitable magnetic material, such as the magnetic ferrites, which preferably has a substantially rectangular hysteresis characteristic with two states of magnetic remanence. The type of memory to be described herein is known as a "word-organized memory." This means that a word at a time, consisting of a plurality of data bits, is either written into the memory or read therefrom. The embodiment of the invention shown in FIGURE 1 can store four words, each consisting of four data bits. This is not to be construed as a limitation upon the invention, but, rather, is to be considered only as exemplary.

In accordance with this invention, data-bit storage can occur in the regions respectively designated by the reference numerals 11 through 44. A first word is stored in bits 11 through 14; a second word is stored in bits 21 through 24; a third word is stored in bits 31 through 34; and a fourth word is stored in bits 41 through 44. Each of the bit-storage regions is effectively defined as the region on the magnetic-material plate which lies between four apertures, respectively 11A, 11B, 11C, 11D through 44A, 44B, 44C, 44D.

Each one of the drive windings required with this memory is represented in a single wire which threads through the apertures of the memory. It should be understood, however, that this is by way of exemplification, and should not be considered as a limitation, since more than one winding turn may be taken, if required, or if desired; however, the system is operable with single-turn windings. For each word stored in the memory there is provided a write-zero winding, respectively 50, 60, 70, 80, which is driven by the respective write-zero-and-read current-pulse sources 52, 62, 72, 82. The write-zero winding 50 threads down through the aperture 11A and, as represented by the dotted line, adjacent the far side of the ferrite plate and then up through the aperture 11D. The winding then progresses similarly through apertures 12A, 12D, then similarly through apertures 13A, 13D, similarly through apertures 14A, 14D, and then is grounded or returned to the write-zero-and-read source 52.

The write-zero winding 60, which is driven from the write-zero-and-read pulse source 62, progresses through the apertures enclosing and associated with data-bit-storage areas 21 through 24 in similar fashion as has been described for the write-zero winding 50. The write-zero winding 70, which is driven from the write-zero-and-read pulse source 72, passes through the A and D apertures which are associated with the data-storage areas 31 through 34 in similar fashion as has been described for the write-zero winding 50. The write-zero winding 80, which is driven by current from the write-zero-and-read current-pulse source 82, passes through the A and D apertures which are associated with the data-storage regions 41 through 44 in similar fashion as has been described for the write-zero winding 50.

A separate write-one winding, respectively 51, 61, 71, and 81, is provided for each one of the words which are stored in the memory. The write-one winding 51, which is driven by a write-one pulse source 53, threads up through the aperture 11C, then across the data-storage region to pass down through the aperture 11D, then underneath the magnetic-material plate to proceed upward through the aperture 12C, then across the data-storage region to pass down through the aperture 12B. The winding then proceeds along the back portion of the magnetic-material plate until it passes upward through the aperture 13C, then across the data-storage region 13, and then down through the aperture 13B. The winding 51 then proceeds across the rear portion of the magnetic-material plate until it is brought upward through the aperture 14C, across the data-storage region 14, then downward through the aperture 14D, and thereafter is connected back to the write-one pulse source 53.

The write-one line 61, which is driven from a write-one pulse source 63, passes between the C and B apertures associated with respective data-storage regions 21, 22, 23, 24 in a fashion similar to that described for the write-one winding 51. The write-one winding 71, which is driven by a write-one pulse source 73, passes through the C and B apertures of the respective data-storage elements 31, 32, 33, and 34 in a fashion similar to that previously described for the write-one winding 51. The write-one winding 81, which is driven by a write-one pulse source 83, passes through the C and B apertures of the respective elements 41 through 44 in the same fashion as has been described in connection with the write-one winding 51.

There is provided for each data bit in a word, which is stored in the memory, a separate digit-and-sense winding, respectively 91, 92, 93, 94. Thus, the data bits in the one of the words stored in the memory elements which have been selected for reading will appear on the digit-and-sense windings 91 through 94.

The digit-and-sense winding 91 is driven from a write-one current-pulse source 101 when it is desired to write one in any one of the elements 11, 21, 31, and 41. A sense circuit 102 is also connected to the digit-and-sense winding 91 and serves the function of reading or sensing the data bit on the digit-and-sense winding 91 when the memory is operated in the reading mode.

The digit-and-sense winding 91 is coupled to the aperture-plate memory by passing down through the aperture 41C, along the back side of the element 41, up through the aperture 41B, thence down through the aperture 31C, underneath the element 31, and thereafter up through the aperture 31B, thence through the aperture 21C, underneath element 21, and up through the aperture 21B, thence down through the aperture 11C, then underneath the element 11, up through the aperture 11B, and then back to the write-one circuit 101. The winding 92 is coupled to the elements 12, 22, 32, 44 by passing through the C to B apertures associated with the elements 42, 32, 22, and 12 in the same manner as has been described for the winding 91. The winding 92 is driven by write-one current-pulse source 103, and is also connected to the sense circuit 106, which detects a digit signal appearing on the winding when the aperture-plate memory is employed in the reading mode.

The winding 93 is coupled to the elements 43, 33, 23, and 13 by passing through their respective C and B apertures in the manner previously described for the winding 91. The winding 93 is driven by a write-one pulse source 107 and is connected to the sense circuit 108 for utilization when in the reading mode. The winding 94 is coupled to the elements 44, 34, 24, 14, by being passed through their C and B apertures in the manner described for the winding 91. The winding 94 is driven by a write-one current-pulse source 109, when required, and is connected to a sense circuit 110, which functions to detect a digit-pulse signal when the aperture-plate memory is driven in the reading mode. It should be appreciated from the preceding description that the digit-and-sense windings are coupled to a column of elements, while the write-one and write-zero windings are coupled to a row of elements. A write-one and a digit-and-sense winding pass through the same aperture at each element with which they are both coupled.

Figure 2:
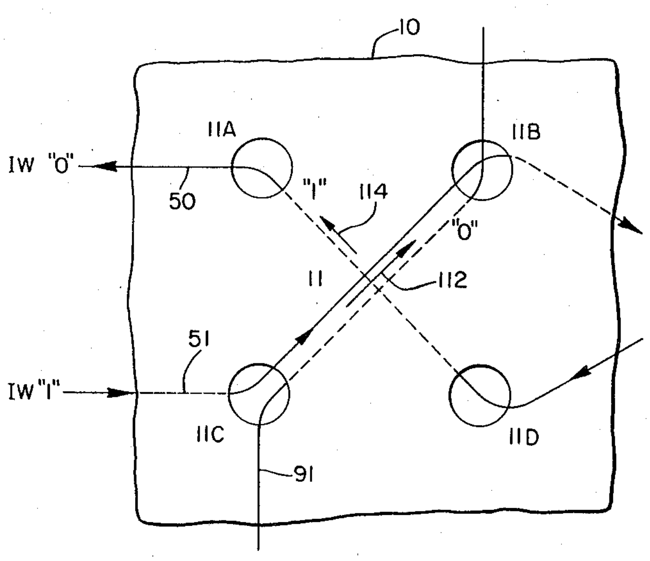
FIGURE 2 is an enlarged view of a portion of the embodiment of the invention, showing a memory element.

Reference is now made to FIGURE 2, which shows an enlarged section of the aperture-plate memory of FIGURE 1 with the necessary windings thereon. More specifically, the section shown is that including the element 11. If a current is applied to the zero drive winding 50, having the direction of the arrowheads shown associated with the winding 50, then, in response to the magnetomotive force applied, there is set up in the region between the holes 11A, 11B, 11C, 11D a magnetic field which is orthogonal to the winding 50. The magnetic vector, represented by the arrow 112, is established by this field and is at right angles to the winding 50 within the data-storage region 11. When the data-storage region 11 is saturated in that state of magnetic remanence represented by the vector 112, it may be said that this represents storage of the data bit zero.

A current pulse of sufficient amplitude applied to the write-one winding 51 can establish a magnetization vector, represented by the arrow 114, which is at right angles to the magnetization vector 112 and also to the winding 51. It is preferred, however, to establish the magnetization vector 114 by applying half the required current to the write-one winding 51 and by applying the remaining half of the required current to the digit-and-sense winding 91. The result is the same.

The element 11 is storing a "one" data bit when it is saturated at a state of magnetic remanence and the vector 114 represents the magnetization vector. The two remanence states of the element 11 are 90° with respect to one another, and switching therebetween can be achieved by driving either the winding 50 or the windings 51 and 91. For the purpose of reading, the winding 50 has a current pulse applied thereto of sufficient amplitude to switch the element 11 to the zero state of remanence if it is not already in that state. Thus, a voltage will be induced in the digit-and-sense winding only if the state of magnetic remanence of the element 11 is that represented by the vector 114.

Figure 3:
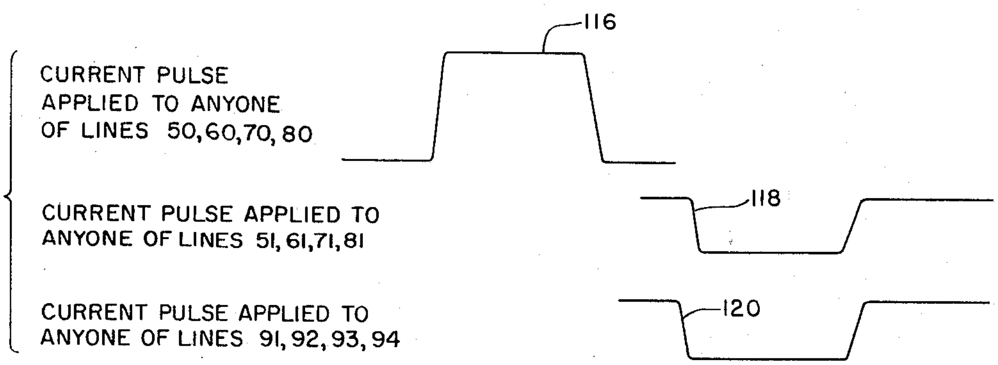
FIGURE 3 is a wave shape drawing illustrating a program for operating the memory.

FIGURE 3 represents a program of current pulses which may constitute a driving program for the aperture-plate memory. Assume that it is desired to write into the elements 11, 12, 13, and 14. The data desired to be written is a zero bit in element 11, a one bit in element 12, a zero bit in element 13, and a one bit in element 14. First, a current pulse, represented by the waveform 116, is applied to the line 50. This current pulse has a sufficient amplitude to drive all the elements 11, 12, 13, and 14 to the zero state of magnetic remanence, as represented by the magnetic vector 12. Thereafter, a current pulse having the waveform 18 is applied to the line 51 from the write-one pulse source 53, and a current pulse having the waveform 120 is applied by the write-one source 103 to the line 92 and by the write-one source 109 to the line 94. It should be appreciated that the excitation of the lines 51, 92, and 94 should all occur coincidentally, in order that the elements 12 and 14 be switched from their zero to their one state. At the conclusion of the writing program, the word consisting of zero, one, zero, one is stored in elements 11, 12, 13, and 14.

Assume, now, that it is desired to read the data stored in the elements 11, 12, 13, and 14. The write-zero current source 52 applies a pulse of current to the zero-write winding 50. This causes elements 12 and 14 to be driven from their one to their zero states of remanence magnetization, whereby voltages are induced in the windings 92 and 94. Since no voltages are induced in the windings 91 and 93, it is known that the data that was stored in the elements 11 and 13 represented zero.

Figure 4:
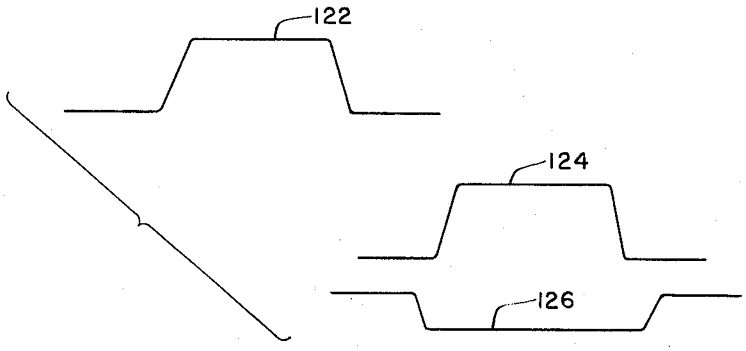
FIGURE 4 is a wave shape drawing illustrating another program suitable for operating the memory.

From the above description, it should become apparent how this invention may be operated for storing words made up of binary bits and how the words which are stored may be read out. An alternative program to the one shown in FIGURE 3 is shown in FIGURE 4. This is an inhibitive type of programming. A pulse of current, represented by the wave shape 122, is applied to the zero-drive windings having an amplitude sufficient to drive all of the elements to which it is applied to a zero state of magnetic remanence. A current pulse, represented by the wave shape 124, is applied to any one of the lines 51, 61, 71, and 81. This current has a sufficient amplitude to drive the elements to which it is applied to their one state. However, should it be desired that any of these elements to which the "one" drive is being applied remain in their zero state, then an inhibit drive is applied to the one of the windings 91, 92, 93, and 94 coupled thereto. This inhibit drive opposes the drive represented by the wave shape 124 and reduces it sufficiently so that those elements to which the inhibit drive is applied will not be driven to the one state.

Since the two stable states of remanent magnetization of any element in the embodiment of the invention are orthogonal with respect to one another, a much faster switching between states of magnetic remanence occurs in this memory than with core memories, for example. Further, in view of the fact that a maximum of two wires are required to pass through a hole instead of three or more wires, as has been done heretofore, the manufacture of this invention is greatly simplified. Further, it enables a complete system to be made employing printed-circuit techniques. It should be further noted that since a very small percentage of the total available flux is switched in operating the embodiment of this invention, the amount of power dissipation per unit area is reduced, and a much higher frequency of access to a given element without heating the element may be achieved. Since the saturation of an element is determined by the small area which is enclosed within four holes, the area surrounding these four holes is not in a high state of saturation. This means that its magnetic reluctance is quite low. The advantage of this type of operation is that it will further reduce the required drive needed to switch an element. The size of the memory and the number of turns of each of the windings taken about each memory element shown in the drawings is exemplary and should not be construed as a limitation upon the invention. The programming for read and write should also be considered merely as exemplary, and not by way of a limitation on the invention.

There has accordingly been described and shown herein a novel, useful, simple, and inexpensive aperture-plate magnetic memory.

I claim:

1. A memory element comprising a plate of magnetic material having at least two states of magnetic remanance, said plate comprising a plurality of memory elements each including a plurality of spaced apertures around a region of the material of said plate, first winding means inductively coupled to predetermined ones of said regions of material by passing through predetermined ones of the apertures around said regions for driving said regions to one of their two states of magnetic remanence, second driving means inductively coupled to said predetermined ones of said regions of material by passing through others of the apertures around said regions than said predetermined ones for driving said regions to the other of said two states of magnetic remanence, and means for sensing the state of magnetic remanence of said predetermined regions of material.

2. A memory element comprising a plate of magnetic material having at least two states of magnetic remanence, four apertures in said plate spaced from one another substantially at the corners of a hypothetical four-sided figure, the magnetic material between said apertures comprising a memory element, a first drive winding inductively coupled to said memory element by passing through the two of said apertures at opposite corners of said four-sided figure, a second drive winding inductively coupled to said memory element by passing through the remaining two of said four apertures, means for applying current to said first drive winding for driving said memory element to one state of magnetic remanence, means for applying current to said second drive winding for driving said memory element to its other state of magnetic remanence, and means for sensing the state of magnetic remanence of said element.

3. A memory element as recited in claim 2 wherein said means for sensing the state of magnetic remanence of said element comprises a third drive winding inductively coupled to said memory element by passing through the same two apertures as said second drive winding.

4. A magnetic memory comprising a plate of magnetic material having at least two states of magnetic remanence, a plurality of apertures in said plate, said apertures being arranged in groups of four, each group of apertures being spaced from another group of apertures, the apertures in each group being spaced from one another and being associated with and defining a storage element within the region of the plate between a group of apertures, a first winding means coupled to predetermined ones of said storage elements by passing through two apertures in each of the groups of apertures associated with these elements for driving these elements to one state of magnetic remanence, a separate second winding means coupled to said predetermined ones of said elements through the remaining two apertures of the groups of apertures defining said predetermined elements for driving said elements toward their one state of magnetic remanence, and a third winding means for each of said predetermined ones of said elements each coupled to each of said elements through the same apertures as said second winding means for driving said elements their one state of remanence.

5. A magnetic-aperture-plate memory comprising a plate of magnetic material having at least two states of magnetic remanence, a plurality of apertures in said plate, said plurality of apertures comprising a plurality of groups of four apertures, said plurality of apertures being arranged in columns and rows, the apertures in each group being spaced from one another and the magnetic material of said plate within the region between the apertures of the group comprising a storage element, said storage elements being aligned in columns and rows, a separate first winding means for each row of storage elements, each said first winding means being inductively coupled to each element of a row by extending through at least two of the apertures of a group associated with an element in a row, a separate second winding means for each column of elements, each said second winding means being inductively coupled to all the elements in a column by extending through two apertures in each one of the groups of apertures associated with said elements through which said first winding means do not extend, a separate third winding means for each row of elements, each of said separate third winding means being inductively coupled to the elements in a row by passing through the two apertures associated with each element through which said first winding means does not pass, means for applying current drives to each of said first, second, and third winding means for selectively driving said elements to store data, and means coupled to each one of said second winding means for sensing the data stored in a row of said elements.

No references cited.

BERNARD KONICK, *Primary Examiner.*

IRVING L. SRAGOW, *Examiner.*

R. R. HUBBARD, J. W. MOFFITT, *Assistant Examiners.*